United States Patent Office 2,731,009
Patented Jan. 17, 1956

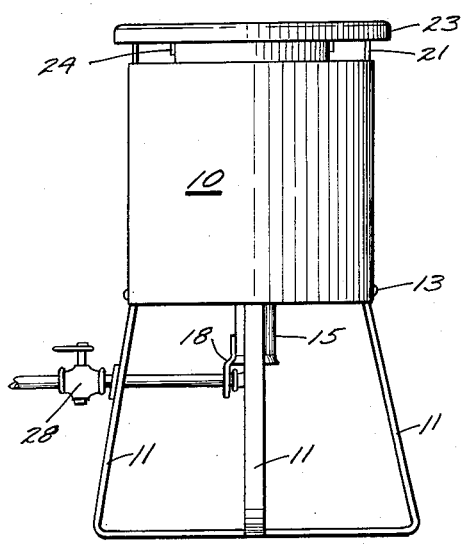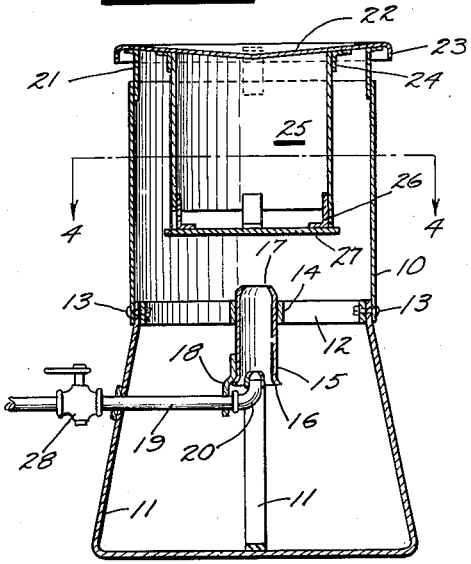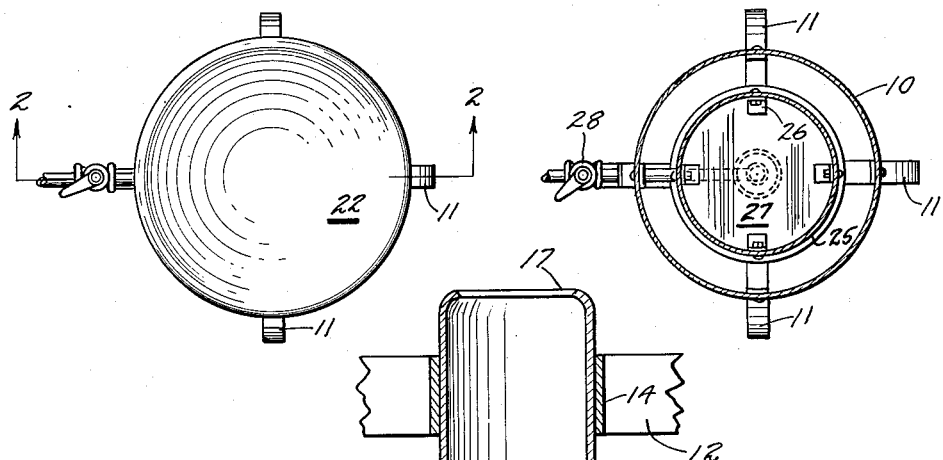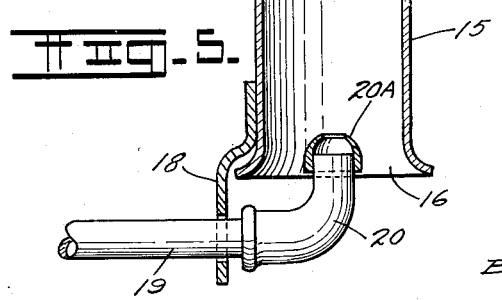

2,731,009

PORTABLE FUEL BURNING SPACE HEATER

Irving F. Pocrass, Charles W. Syak, and Bernard Pocrass, Youngstown, Ohio, assignors to The Bica Company, Girard, Ohio, a corporation of Ohio Application June 24, 1952, Serial No. 295,158

3 Claims. (Cl. 126—85)

This invention relates to a portable space heater and more particularly to a space heater suitable for use in connection with heating new building constructions and the like.

The principal object of the invention is the provision of a portable space heater adatped to burn liquefied petroleum gases and provide maximum heating efficiency.

A further object of the invention is the provision of a portable space heater which produces both radiant and convected heat and is, therefore, capable of supplying heat for many and various uses.

A still further object of the invention is the provision of a portable space heater designed for efficient fuel consumption as well as low essential cost and at the same time providing a relatively high B. t. u. output comparable with its size and fuel consumption.

The portable space heater disclosed herein comprises an improvement in the art of portable heaters such as those used in heating new building constructions and the like and generally called salamanders, and including heaters used in various industrial plants for portable space heating as well as those used in orchards and the like for preventing frost damage. The portable space heaters of this general type have in the past generally utilized fuel oils, kerosene and the like in a relatively inefficient manner and produced objectionable quantities of combustion by-products as well as partially burned fuel in the form of soot, carbon, smoke, etc.

The presently disclosed space heater is adapted to operate on liquefied petroleum gases and is so designed as to burn the same completely cleanly and efficiently whereby no obnoxious products of combustion are produced which facilitate extension in area of operation of the space heater into enclosed areas where such heaters have not heretofore been utilized.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is a side view of the portable space heater.

Figure 2 is a vertical section.

Figure 3 is a top plan view of Figure 2.

Figure 4 is a horizontal section taken on line 4—4 of Figure 2.

Figure 5 is an enlarged detail of a portion of the space heater shown in Figures 1 through 4 of the drawings.

By referring to the drawings and Figures 1 through 4 in particular it will be observed that the portable space heater comprises a cylindrical casing 10 having a pair of crossed U-shaped leg constructions 11—11 attached to the lower portion thereof. The interconnecting horizontal portions of the semi-U shaped legs 11—11 are positioned on flat horizontal planes to enable the heater to be located on various types of supports including narrow planks or ladders if desired.

A transverse body member 12 is secured across the lower portion of the cylindrical casing 10 and is secured thereto by a plurality of fasteners 13 which also attach the upper ends of the semi-U shaped legs 11—11 to the cylindrical casing 10. The transverse body member 12 has an annular section 14 midway between its ends which positions a tubular burner 15 which is flared outwardly at its lower end 16 and inwardly at its upper end 17 so that the area of the orifice formed by its lower end is larger than the area of the orifice formed by its upper end 17.

The tubular burner 15 is provided with a depending strap 18 which supports a fuel supply line 19 and a fuel injection nozzle 20. The nozzle 20 is similar in formation to an L with a frusto-conical outlet by means of which liquefied petroleum gases flowing through the supply line 19 will be directed upwardly in a jet action through the center of the tubular burner 15 thereby drawing air upwardly through the flared lower end 16 to properly support combustion above the combustion tube 15.

A plurality of inverted L-shaped brackets 21 are secured to the upper edge of the cylindrical casing 10 and extend a relatively short distance thereabove and support a circular deflector head 22 which is flanged as at 23 and which is dished progressively to its center as best shown in Figure 2 of the drawings.

A plurality of secondary L-shaped brackets 24 are secured to the lower surface of the circular deflector head 22 in a circumferential pattern and provide means for securing a depending cylindrical baffle 25 thereagainst, as also best illustrated in Figure 2 of the drawings. The lower end of the cylindrical baffle 25 has a plurality of depending brackets 26 secured thereto by means of which a flat circular baffle 27 is mounted in spaced relation to the lower edge of the cylindrical baffle 25 and above the upper inwardly flared end 17 of the tubualr burner 15. It will thus be observed that flame and the products of combustion at the upper end 17 of the tubular burner 15 will be caused to fan out in an annular pattern by the circular baffle 27 and that the flame and products of combustion will flow upwardly between the cylindrical casing 10 and the cylindrical baffle 25. The flame and products of combustion flowing upwardly between the cylindrical body member 10 and cylindrical baffle 25 will move large quantities of air into and through the device heating the same, and which air and products of combustion will emerge from beneath the flange 23 on the circular deflector head 22.

The air within the cylindrical baffle 25 will become heated and the cylindrica baffle 25 in the central area of the deflector head 22 will become heated to a degree resulting in production of considerable radiant heat which will add to the total amount of heat produced by the device. Additionally, the circular baffle 27 and cylindrical baffle 25 will superheat the air flowing therebetween and the expansion of the same will cause it to flow outwardly and again add to the total amount of heat produced. Another function of the circular baffle 27 and cylindrical baffle 25 is to provide a central superheated area resulting in more efficient combustion of the liquefied petroleum gases burned in the device to the end that all of the fuel supplied the device is completely burned and the air and products of combustion flowing from the device are free of carbon and partially burned gases.

It will thus be seen that a simple and efficient portable space heater has been disclosed which meets the several objects of the invention.

Those skilled in the art will recognize that the fuel supply line 19 is preferably provided with a control valve 23 and that if desired a pressure regulator such as known in the art may be employed in connection therewith.

By referring now to Figure 5 of the drawings a detailed sectional elevation of the tubular burner 15 may be seen and it will be observed that the nozzle 20 extends into the outwardly flared lower end 16 of the tubular burner 15 and that it terminates in an inwardly flared portion 20A to achieve a Venturi jet-like action resulting in efficient combustion.

Those skilled in the art will also observe that the device is capable of being prefabricated and shipped knocked down in a relatively small and compact package and easily and quickly assembled on location. This feature enables the device to be sold and shipped at minimum cost.

Having thus described our invention, what we claim is:

1. A portable space heater comprising a cylindrical casing open at its upper and lower ends and having an upwardly discharging tubular burner supported axially of and partially within its lower end and spaced with respect to said casing, and means for supplying a fuel mixture to said tubular burner, means supporting said cylindrical casing in elevated relation to a supporting surface, a dished deflector head supported by the upper end of said casing in spaced overlying relation thereto to form an annular opening therebetween, a cylindrical baffle supported vertically within said cylindrical casing and spaced with respect thereto and engaging said dished deflector head, and a flat circular baffle supported by the lower end of said cylindrical baffle and spaced with respect to the same and with respect to said tubular burner.

2. The portable space heater set forth in claim 1 wherein the cylindrical baffle is attached at its uppermost end to said deflector head.

3. A space heater comprising an outer cylindrical casing open at its upper and lower ends and having legs for supporting the same in elevated relation to a supporting surface, an upwardly discharging fuel burner positioned centrally of said outer casing and partialy within and partially without its lower end, said outer cylindrical casing being widely spaced about said fuel burner with the majority of said casing lying above said burner, a downwardly flanged top member supported by the upper end of said outer cylindrical casing in spaced overlying relation with respect thereto to form an annular opening therebetween, a hollow cylindrical baffle affixed to said top member centrally thereof and depending therefrom, a flat circular deflector supported by said hollow cylindrical baffle beneath the same in spaced underlying relation thereto and spaced above said fuel burner, said hollow cylindrical baffle being of a smaller size than said outer cylindrical casing and forming a chamber between said outer cylindrical casing and said hollow baffle.

References Cited in the file of this patent
UNITED STATES PATENTS

| | | |
|---|---|---|
| 569,658 | Nyberg | Oct. 20, 1896 |
| 737,977 | Tyson | Sept. 1, 1903 |
| 1,232,457 | Campbell | July 3, 1917 |
| 1,390,296 | Kirkwood | Sept. 13, 1921 |
| 1,451,910 | Hoffman | Apr. 17, 1923 |
| 1,666,233 | Campbell | Apr. 17, 1928 |
| 1,767,670 | Huff | June 24, 1930 |
| 2,357,575 | Benz | Sept. 5, 1944 |
| 2,475,240 | Hassmer | July 5, 1949 |
| 2,577,372 | Smith | Dec. 4, 1951 |